Patented Nov. 24, 1925.

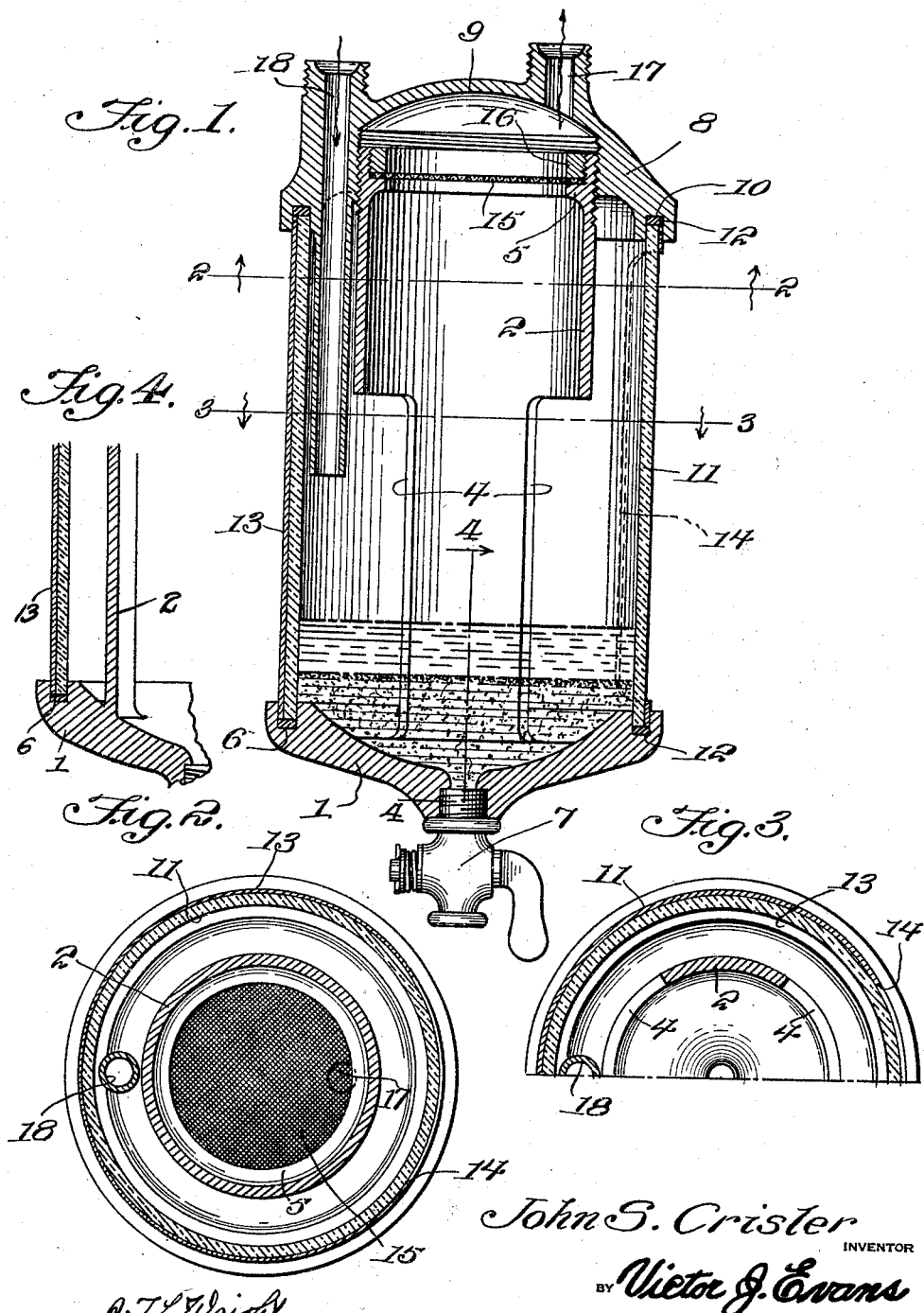

1,563,259

UNITED STATES PATENT OFFICE.

JOHN S. CRISLER, OF CARSON, IOWA.

FILTER AND TRAP.

Application filed February 13, 1925. Serial No. 8,970.

*To all whom it may concern:*

Be it known that I, JOHN S. CRISLER, a citizen of the United States, residing at Carson, in the county of Pottawattamie and State of Iowa, have invented new and useful Improvements in Filters and Traps, of which the following is a specification.

This invention relates to a filter and trap for filtering the gasoline supply of motor vehicles and the like, and which may be used for other purposes, the general object of the invention being to provide a chamber with the filtering medium at the top thereof so that sediment and water will collect in the bottom of the chamber where it can be easily removed and will not clog up the filtering medium or the pipes of the device.

Another object of the invention is to provide the device with a window so that the passage of the fluid through the same can be seen.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through the device.

Figure 2 is a section on line 2—2 of Figure 1.

Figure 3 is a section on line 3—3 of Figure 1.

Figure 4 is a section on line 4—4 of Figure 1.

In these views, 1 indicates a base member of substantially saucer shape and which has connected thereto the lower end of a cylinder 2 which is provided with elongated openings 4 in its lower part and with an internal flange 5 at its upper end. The base is also provided with an annular groove 6 which is spaced outwardly from the cylinder 2. A drain cock 7 is arranged at the center of the base so that the device can be drained by opening this cock. A top member 8 is provided with a cup-shaped recess 9 at its center, the walls of which are screw threaded to receive the screw threaded upper end of the cylinder 2 and the outer part of this member is provided with an annular groove 10. A cylinder 11, of glass or other transparent material, has its upper and lower edges engaging the grooves 6 and 10, suitable packing material 12 being placed in the grooves to make a water tight joint between the parts. A metal jacket 13 encloses the cylinder 11 to protect the same and this jacket is provided with a window 14 which exposes a portion of the cylinder so that the interior of the device can be seen through said window. A screen 15 or other filtering medium is placed on the flange 5 and held in place by a ring 16 which is threaded in the end of the cylinder 2. An outlet nipple 17 is in communication with the recess 9 and an inlet port 18 is formed in the member 3 and is in communication with the space between the cylinders 2 and 11.

From the foregoing it will be seen that the incoming fluid flowing into the device through the port 18 will be directed towards the bottom of the same by the closed upper part of the cylinder 2. This fluid will pass through the openings 4 and continue upwardly through the screen 15 into the recess 9 and pass out of the nipples 17. Foreign matter and water in the fluid will collect in the bottom of the device, as shown in Figure 1 and this matter can be drained by opening the cock 7. The foreign matter will not interfere with the passage of the fluid through the device and as it does not come in contact with the screen it will not clog the screen. The device can be easily cleaned by removing the base part without interfering with the pipe connections or the member 8.

The parts are assembled by first placing the screen 15 in the cylinder 2 and screwing in the ring 16. Then the cylinder 11 and the jacket 13 are placed with their lower ends in the groove of the base and then the top member 8 is screwed upon the top of the cylinder 2 until its groove engages the top of the glass cylinder and jacket. The parts are screwed down tight enough to make a tight joint between the gaskets 12 and their contacting parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a base having a drain opening, a cylinder connected at its lower end with the base and forming a central chamber, a second cylinder surrounding and spaced from the first and forming an outer chamber, a top member connected with the inner cylinder, and with the top end of the outer cylinder, the top member having an inlet passage therein communicating with the top of the other chamber and an outlet passage communicating with the top of the inner chamber, a screen adjacent the top of the inner chamber, the inner cylinder having elongated openings in its bottom part and a window in the outer cylinder.

In testimony whereof I affix my signature.

JOHN S. CRISLER.